(12) United States Patent
Sugumaran (10) Patent No.: US 8,140,410 B2
(45) Date of Patent: *Mar. 20, 2012

(54) METHOD, SYSTEM, AND PROGRAM FOR TRANSLATING AND INTERFACING BETWEEN DATA POOLS AND PRODUCT INFORMATION MANAGEMENT (PIM) SYSTEMS

(75) Inventor: Harikrishnan Sugumaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1132 days.

This patent is subject to a terminal disclaimer.

(21) Appl. No.: 11/955,379

(22) Filed: Dec. 12, 2007

(65) Prior Publication Data

US 2008/0091640 A1 Apr. 17, 2008

Related U.S. Application Data

(62) Division of application No. 10/951,530, filed on Sep. 27, 2004, now abandoned.

(51) Int. Cl.
*G06Q 30/00* (2006.01)
*G06Q 90/00* (2006.01)

(52) U.S. Cl. .................. 705/27.1; 705/500; 707/999.01

(58) Field of Classification Search ............. 707/999.01, 707/999.104; 705/4, 27.1, 500
See application file for complete search history.

(56) References Cited

U.S. PATENT DOCUMENTS

| | | | |
|---|---|---|---|
| 5,873,102 A | 2/1999 | Bridge, Jr. et al. | |
| 6,324,693 B1 | 11/2001 | Broderson et al. | |
| 6,502,098 B2 | 12/2002 | Lau | |
| 6,505,200 B1 | 1/2003 | Ims et al. | |
| 6,532,465 B2 | 3/2003 | Hartley et al. | |
| 6,633,910 B1 | 10/2003 | Rajan et al. | |
| 6,694,336 B1 | 2/2004 | Multer et al. | |
| 6,738,789 B2 | 5/2004 | Multer et al. | |
| 6,742,001 B2 | 5/2004 | Ripley | |
| 6,757,696 B2 | 6/2004 | Multer et al. | |
| 6,892,185 B1 | 5/2005 | Van Etten et al. | |
| 6,965,899 B1 | 11/2005 | Subramaniam et al. | |
| 7,043,687 B2 | 5/2006 | Knauss et al. | |

(Continued)

OTHER PUBLICATIONS

EAN International, "Global Data Synchronization FAQ", [online], [retrieved on Sep. 20, 2004], retrieved from the Internet at <URL: http//www.ean-int.org/GDS/Documents/040615_faq_gds.pdf>, 23 pp.

(Continued)

*Primary Examiner* — Nicholas D Rosen
(74) *Attorney, Agent, or Firm* — Konrad Raynes & Victor LLP; David W. Victor (57) ABSTRACT

Provided are a method, system, and program for translating and interfacing between data pools and product information management (PIM) systems. An element mapping is generated for each of a plurality of data pools mapping user elements and attributes to the data pool elements and attributes, wherein the data pools maintain product information. A message mapping is generated for each of the plurality of data pools mapping user messages and their parameters to data pool messages and their parameters. For each of the plurality of data pools, code is maintained that is enabled to cause operations comprising receiving a first document including user elements and messages and mapping the user elements and messages in the first document to a second document including data pool elements and attributes corresponding to the user elements and messages in the first document.

15 Claims, 6 Drawing Sheets

U.S. PATENT DOCUMENTS

| | | | |
|---|---|---|---|
| 7,152,072 | B2 | 12/2006 | Dobrowski et al. |
| 7,337,176 | B1 | 2/2008 | Cheedella et al. |
| 7,418,456 | B2 | 8/2008 | Charlet et al. |
| 7,865,403 | B2 * | 1/2011 | Sugumaran .......... 705/26.1 |
| 2002/0002566 | A1 | 1/2002 | Gajraj |
| 2002/0169893 | A1 | 11/2002 | Chen et al. |
| 2003/0233383 | A1 | 12/2003 | Koskimies |
| 2004/0044799 | A1 | 3/2004 | Sivaraman et al. |
| 2004/0083472 | A1 | 4/2004 | Rao et al. |
| 2004/0123241 | A1 | 6/2004 | Kaappa et al. |
| 2004/0162833 | A1 | 8/2004 | Jones et al. |
| 2006/0074841 | A1 | 4/2006 | Sugumaran |
| 2008/0091648 | A1 | 4/2008 | Sugumaran |

OTHER PUBLICATIONS

Global Exchange Services, "Community Solutions—Managed Data Pool" [online], [retrieved on Sep. 20, 2004], Retrieved from the Internet at <URL: http://www.gxs.com/solutions_community_managedDataPool.htm>, 3 pp.

IBM Corporation, "Product Information Solution for Consumer Products", Copyright 2004, 2 pp.

IBM Corporation, "Product Information Solution for Retail", Copyright 2004, 3 pp.

IBM Corporation, "WebSphere Product Center" [online], [retrieved on Sep. 19, 2004], Retrieved from the Internet at <URL: http://www-303.ibm.com/software/intergration/wpc/features>, 2 pp.

Stelzer, J.L., "Data Pools, Catalogs, and PIMS, Oh My!" Frontline Solutions, [online], Jul. 1, 2004, [retrieved on Sep. 20, 2004], retrieved from the Internet at <URL: http://www.frontlinetoday.com/frontline/content/printContentPopup.jsp?id=104623>, 4 pp.

UCCNET, "What is the GDSN and How Does it Work?", [online], [retrieved on Sep. 20, 2004], retrieved from the Internet at <URL: http://www.uccnet.org/Docs/pdf/what%20is%20GDSN%202%20pager.pdf>, 2 pp.

US Patent Application, filed on Dec. 12, 2007, entitled "Method, System, and Program for Translating and Interfacing Between Data Pools and Product Information Management (PIM) Systems", invented by H. Sugumaran.

WWRE, "WWRE Item Synchronization—Supplier Frequently Asked Questions", [online], [retrieved on Sep. 20, 2004], retrieved from the Internet at <URL: http://www.worldwideretailexchange.org/cs/en/grocery_response/faq.pdf, 8 pp.

Notice of Allowance 1 for U.S. Appl. No. 11/955,375, dated Aug. 11, 2010, 6 pp. [54.43D1 (NOA1)].

Office Action 1 for U.S. Appl. No. 10/951,530, dated Nov. 19, 2007, 8 pp. [54.43 (OA1)].

Office Action 1 for U.S. Appl. No. 11/955,375, dated Jan. 13, 2010, 20 pp. [54.43D1 (OA1)].

Office Action 2 for U.S. Appl. No. 10/951,530, dated May 16, 2008, 6 pp. [54.43 (OA2)].

Office Action 3 for U.S. Appl. No. 10/951,530, dated Nov. 7, 2008, 10 pp. [54.43 (OA3)].

Response to Restriction Requirement for U.S. Appl. No. 10/951,530, dated Aug. 3, 2007, 12 pp. [54.43 (R-RestReq )].

Restriction Requirement for U.S. Appl. No. 10/951,530, dated Jul. 3, 2007, 5 pp. [54.43 (RestReq)].

Response to Office Action 1 for U.S. Appl. No. 10/651,530, dated Feb. 19, 2008, 7 pp. [54.43 (ROA1)].

Response to Office Action 1 for U.S. Appl. No. 11/955,375, dated Jul. 13, 2010, 14 pp. [54.43D1 (ROA1)].

Response to Office Action 2 for U.S. Appl. No. 10/951,530, dated Aug. 18, 2008, 6 pp. [54.43 (ROA2)].

Supplemental Response to Office Action 2 for U.S. Appl. No. 10/951,530, dated Aug. 19, 2008, 4 pp. [54.43 RuppROA2)].

ANON., "Global eXchange Services Tapped by Leading UK Supply Chain Standards Association to Drive International Data Synchronization", Business Wire, Mar. 29, 2004, 3 pp.

ANON., "Veo Systems Announces Support for Sun Microsystems' New Java Development Kit with Java-Based Parser; Veo Systems Leads Integration of XML and Java", Business Wire, Dec. 8, 1998, 2 pp.

* cited by examiner

METHOD, SYSTEM, AND PROGRAM FOR TRANSLATING AND INTERFACING BETWEEN DATA POOLS AND PRODUCT INFORMATION MANAGEMENT (PIM) SYSTEMS

CROSS-REFERENCE TO RELATED APPLICATIONS

This is a divisional application of application Ser. No. 10/951,530, filed Sep. 27, 2004, titled "METHOD, SYSTEM, AND PROGRAM FOR TRANSLATING AND INTERFACING BETWEEN DATA POOLS AND PRODUCT INFORMATION MANAGEMENT (PIM) SYSTEMS", the disclosure of which is incorporated herein by reference in its entirety:

BACKGROUND OF THE INVENTION

1. Field of the Invention

The present invention relates to a method, system, and program for translating and interfacing between data pools and product information management (PIM) systems 2. Description of the Related Art Global Data Synchronization (GDS) is a process of exchanging product information between enterprise systems of suppliers and retailers. A supplier presents information on new/existing products to a data pool that is accessed by different retailers. The data pool requires the use of a standardized document to submit product information and request such information, usually through an Extensible Markup Language (XML) document including a XML Schema Definition (XSD) or Document Type Definition specified by the particular data pool. The data pool comprises a central location for storing the product information. Data pools streamline the process through which supplier product information is maintained and disseminated to retailers that may be interested in the product by providing a common format for the data. There are different data pool providers, such as UCCnet™, Transora™, World Wide Retail Exchange™, etc. Each data pool provider requires a different format for messages and the XML schema to update and access product information in the data pool.

The supplier sends the standardized product information to the data pool in an XML document conforming to the data pool's requirements to publish the product information. The supplier may also update existing product information in the data pool. Retailers may then subscribe to receive product information for specified products or products having certain attributes defined in the standard documents from the suppliers. The data pool may validate the product information published by the supplier. The retailer downloads the information in the data pool specific format.

A global registry provides an index to the extended item information for the products, i.e., the XML elements and attributes for each product. The extended item or product information for a product may include information on the operation, design, packaging, pricing, features, uses, ratings, etc. for a product, i.e., basically any information a retailer would be interested in reviewing when assessing a product. For each product maintained in a data pool, the global registry contains a short description of the product and item number, as well as a location of the data pool that hosts the product information. The supplier's data pool provider publishes information about the supplier's product to the global registry. The retailer's data pool provider, which may or may not be the supplier's provider, sends subscription information to the global registry. If publication and subscription information match, then the supplier data pool sends the requested product information to the retailer data pool. A Global Data Synchronization Network (GDSN) refers to the exchange of product information between different data pools connected via the global registry.

SUMMARY

Provided are a method, system, and program for translating and interfacing between data pools and product information management (PIM) systems. An element mapping is generated for each of a plurality of data pools mapping user elements and attributes to the data pool elements and attributes, wherein the data pools maintain product information. A message mapping is generated for each of the plurality of data pools mapping user messages and their parameters to data pool messages and their parameters. For each of the plurality of data pools, code is maintained that is enabled to cause operations comprising receiving a first document including user elements and messages and mapping the user elements and messages in the first document to a second document including data pool elements and attributes corresponding to the user elements and messages in the first document.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
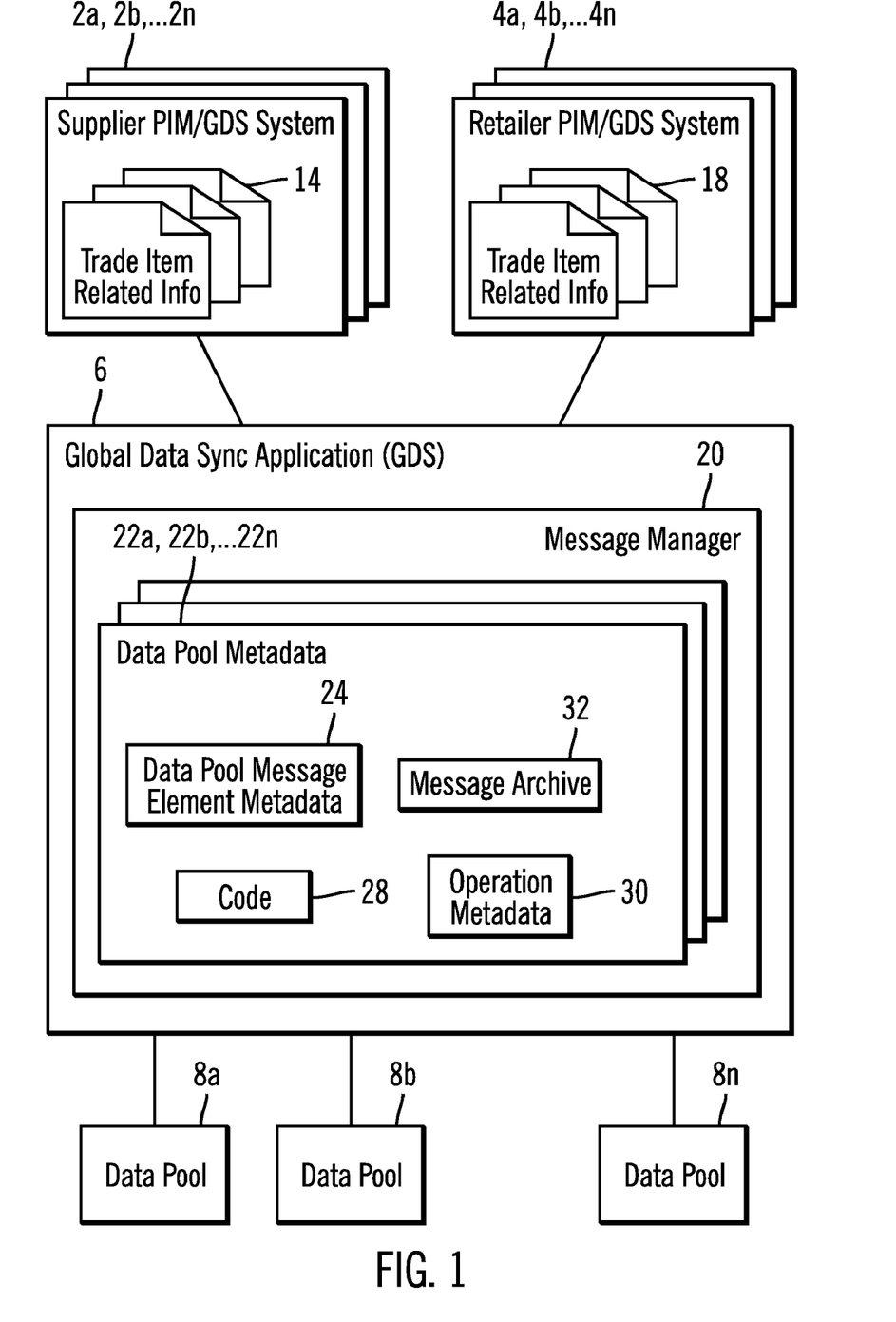
FIG. 1 illustrates an embodiment of a network computing environment.

FIG. 1 illustrates a network computing environment having a plurality of supplier systems $2a, 2b \ldots 2n$ and retailer systems $4a, 4b \ldots 4n$ that connect to a Global Data Synchronization (GDS) system 6 that provides an interface between suppliers and retailers and separate commercial data pools $8a, 8b \ldots 8n$. In certain embodiments, there is not any direct messaging between the retailer and supplier. Further, there may be separate GDS systems between the retailer PIM/GDS systems $4a, 4b \ldots 4n$ and data pools $8a, 8b \ldots 8n$ and supplier PIM/GDS systems $2a, 2b \ldots 2n$ and data pools $8a, 8b \ldots 8n$. The data pools $8a, 8b \ldots 8n$ maintain product information in different formats and may require use of different messaging and data exchange formats to communication product information to the data pool. The product information maintained for a product may comprise any information a retailer would be interested in reviewing when assessing a product, including information concerning the operation, design, packaging, pricing, features, uses, ratings, etc. of the product. The supplier PIM/GDS systems $2a, 2b \ldots 2n$ maintain product information for supplier products and PIM/GDS code to manipulate that product information and interface with the data pool manager 6, where a supplier may be a manufacturer, assembler, vendor, distributor, middleman, etc. of goods to retailers. The supplier may assemble trade item related information 14 to publish information to add a product to one of the data pools $8a, 8b \ldots 8n$, to update product information, or to discontinue a product. The supplier trade item related information 14 may include messages comprising an operation to perform with respect to product information defined in XML elements and attributes. The retailer PIM/GDS systems 4a, 4b . . . n maintain product information for the retailer and code PIM/GDS code to manage and access product information for the retailer, where a retailer may comprise a business that sells or supplies products to a target market, such as the general public, businesses (i.e., business-to-business), further retailers, jobbers, etc. The retailers may assemble trade item related information 18 to request product information from one of the data pools 8a, 8b . . . 8n. The retailer trade item related info 18 may include messages requesting product information specified in XML elements and attributes that suppliers publish in the data pool 8a, 8b, 8n targeted by the retailer. The trade item related information 14, 18 may comprise an XML document in a format used by the PIM/GDS retailer 4a, 4b . . . 4n and supplier 2a, 2b . . . 2n systems and the GDS system 6.

The GDS 6 system includes a message manager 20 to manage messages received in the form of XML documents from the supplier PIM/GDS systems 2a, 2b . . . 2n, the retailer PIM/GDS systems 4a, 4b . . . 4n, and the data pools 8a, 8b . . . 8n. The message manager 20 includes data pool metadata 22a, 22b . . . 2n for each data pool 8a, 8b . . . 8n with which the data pool manager 6 interfaces. The data pool metadata 22a, 22b . . . 2n for each data pool 8a, 8b . . . 8n includes data pool message metadata 24, code 28, operation metadata 30, and a message archive 32. FIG. 1 shows one instance of the data pool metadata components for one data pool and the other data pool metadata would also include these components 24, 28, 30, and 32.

The data pool message element metadata 24 provides for elements and attributes defined in the PIM/GDS trade item related info 14, 18 a corresponding element and attribute in one data pool 8a, 8b . . . 8n or a fixed value defined for the element. The data pool message element metadata 24 may also specify the relationship of elements, e.g., child, parent, etc. Code 28 comprises code the message manager 20 executes to use the data pool message element metadata 24 to translate messages requests between the supplier/retailer and the data pool. The code 28 includes code to map PIM/GDS operations to corresponding data pool operations, as well as a mapping of the PIM parameters for the PIM operation to the data pool parameters to use with the corresponding data pool operation. Thus, the code 28 maintains the message choreography for the particular PIM/GDS to data pool message mapping. This message mapping may involve the use of an internal workflow engine to validate check the parameters of the supplier PIM/GDS message and generate the data pool message.

The operation metadata 30 includes configuration information on the data pool 8a, 8b . . . 8n represented by the data pool metadata 22a, 22b . . . 2n, such as user name and passwords to use to connect to the data pool 8a, 8b . . . 8n. Further, the operational metadata 30 may include messages that are inbound or outbound to a data pool having references to respective data pool message element metadata for all the elements that can be part of this message or operation. The operation metadata 30 may be different and specific for different retailers and suppliers. A message archive 32 archives and stores any messages sent from the supplier systems 2a, 2b . . . 2n, the retailer systems 4a, 4b . . . 4n, and the data pools 8a, 8b . . . 8n for one data pool 8a, 8b . . . 8n.

The supplier 2a, 2b . . . 2n and retailer PIM/GDS systems 4a, 4b . . . 4n may comprise a computing device capable of submitting product information related requests or transactions over a network (not shown) to the GDS 6 system, including desktop computers, notebook computers, workstations, hand held computers, servers, mainframes, telephony devices, etc. The GDS system 6 may comprise one or more computational machines, such as one or more servers, suitable for handling transaction requests from multiple supplier 2a, 2b . . . 2n, retailer 4a, 4b . . . 4n, and data pool 8a, 8b . . . 8n systems. The supplier 2a, 2b . . . 2n and retailer 4a, 4b . . . 4n PIM/GDS systems may communicate with the GDS 6 over a network (not shown) and the GDS 6 may communicate with the data pools 8a, 8b . . . 8n over the same or different network (not shown). The network(s) may comprise a Wide Area Network (WAN), Local Area Network (LAN), Storage Area Network (SAN), wireless network, the Internet, and Intranet, etc.

The data pools 8a, 8b . . . 8n may comprise separately managed synchronized data pools including synchronized product information published by different product suppliers. For instance, the different data pool providers may include UCCnet™, Transora™, World Wide Retail Exchange™, etc. Each data pool 8a, 8b . . . 8n may provide different element and attribute arrangements and use different document formats to exchange product information.

Figure 2:
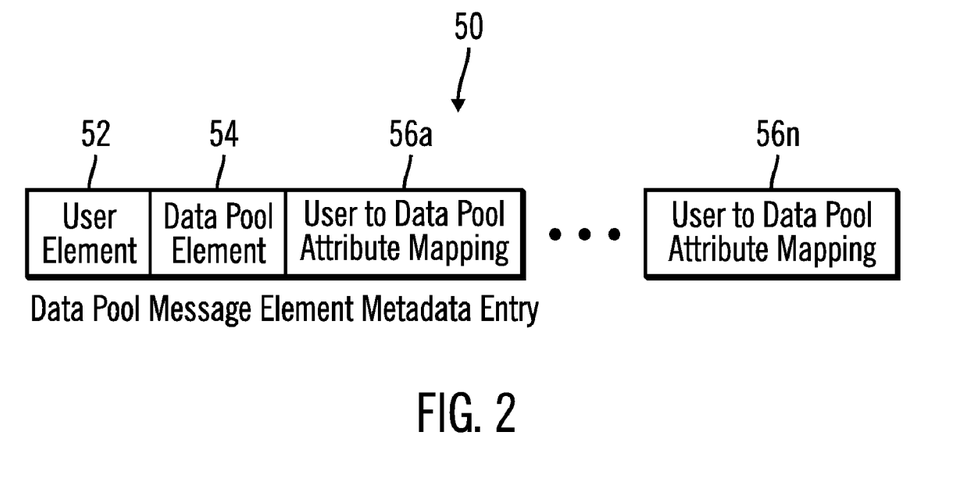
FIG. 2 illustrates an embodiment of element mapping data.

FIG. 2 illustrates an example of a data pool message element metadata mapping entry 50 identifying a user element 52 and corresponding data pool element 54. Further, the entry 50 includes one or more user-to-data pool attribute mappings 56a . . . 56n to map the user attributes of the user element to the corresponding data pool attributes. User elements and attributes refers to those elements, attributes and other components used by the suppliers, retailers, and GDS system to communicate product and trade item related information, or PIM/GDS elements, attributes, components, etc.

Figure 3:
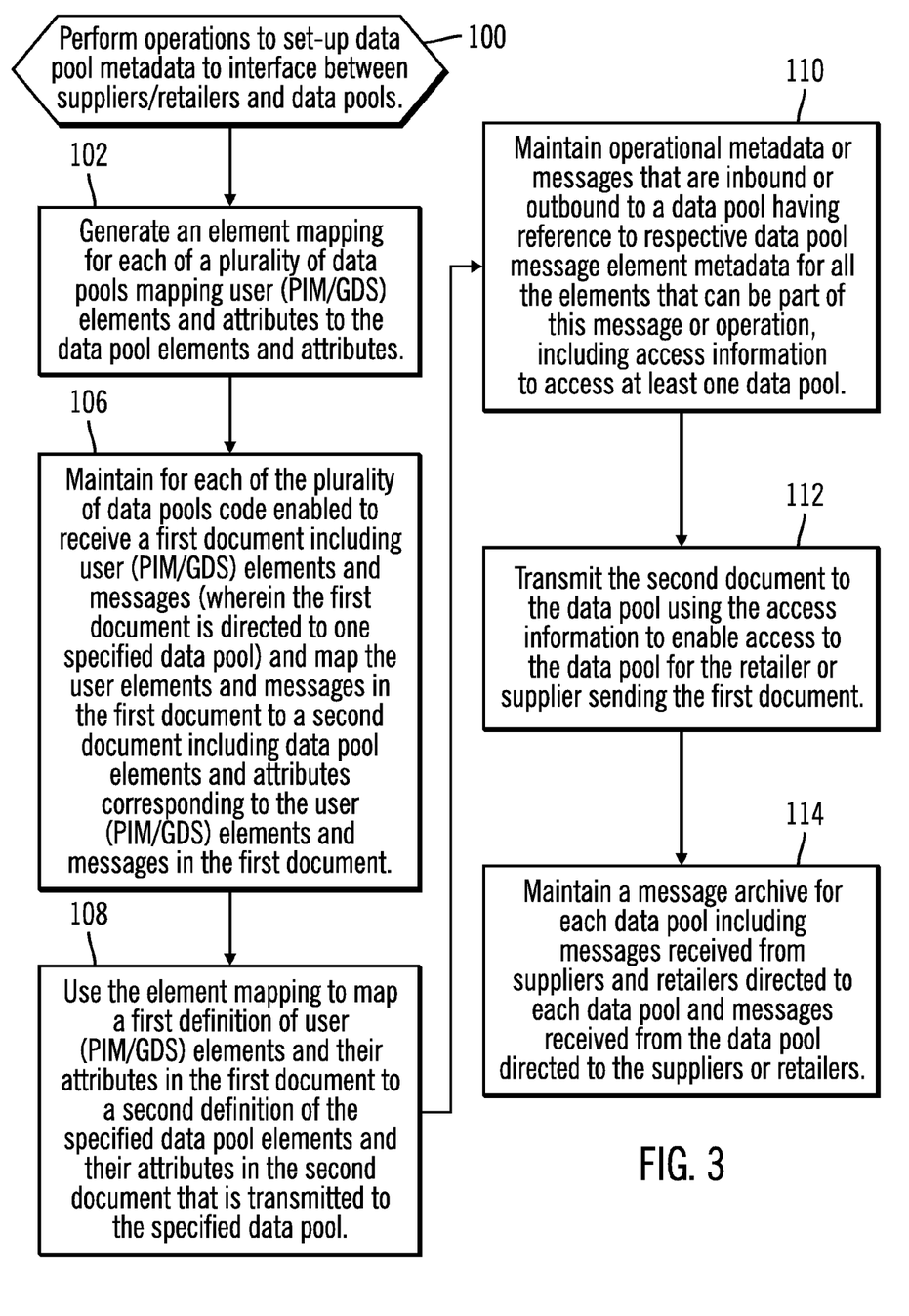
FIGS. 3, 4, 5, and 6 illustrate embodiments of operations to interface between suppliers/retailers and data pools.

FIG. 3 illustrates operations to set-up (at block 100) data pool metadata 22a, 22b . . . 2n to interface between suppliers/retailers and separately managed data pools 8a, 8b . . . 8. An element mapping 24 is generated (at block 102) for each of a plurality of data pools 8a, 8b . . . 8n mapping user (i.e., PIM/GDS) elements and attributes to the data pool 8a, 8b . . . 8n elements and attributes, such as PIM-data pool element mapping entries 50 (FIG. 2). In PIM/GDS embodiments, the user elements, attributes, and messages refers to PIM/GDS elements, attributes, and messages used by the supplier, retailer and GDS systems. The data pool metadata 22a, 22b . . . 20n further maintains (at block 106) for each of the plurality of data pools 8a, 8b . . . 8n code 28 enabled to process a first document, e.g., trade item related information 14, 16, including user elements and messages (wherein the first document is directed to one specified data pool) and map the user elements and messages in the first document to a second document including data pool elements and attributes corresponding to the user elements and messages in the first document. The second document is sent to the data pool 8a, 8b . . . 8n to process. In certain embodiments, the data pool message element metadata 24 and code 28 for each data pool 8a, 8b . . . 8n may be manually coded by reviewing the element and attribute schema, e.g., the XML Schema Definition (XSD) or Document Type Definition (DTD), of documents used by the data pools 8a, 8b . . . 8n as well as specifications provided by the data pools 8a, 8b . . . 8n describing the format of messages and operations.

The message manager 20 uses (at block 108) the element mapping 24 and executes the code 28 to map a first definition of user (PIM/GDS) elements and their attributes in the first document, e.g., 14, to a second definition of the specified data pool elements and their attributes in the second document that is transmitted to the specified data pool 8a, 8b . . . 8n. The first document, e.g., 14, from the supplier or retailer systems includes an identifier of the data pool 8a, 8b . . . 8n to which the requests and operations in the first document are directed.

The data pool metadata 22a, 22b . . . 22n may further include (at block 110) operational metadata 30 for each retailer and supplier initiating documents including user (PIM/GDS) messages including access information to access at least one data pool. Each retailer and supplier may have separate access, e.g., login, information or the same access information may be used for multiple suppliers and retailers. The operation metadata 30 may further include a network address of the supplier systems 2a, 2b . . . 2n, retailer systems 4a, 4b . . . 4n, and data pools 8a, 8b . . . 8n. The message manager 20 transmits (at block 112) the second document to the specified data pool 8a, 8b . . . 8n using the access information to enable access to the data pool 8a, 8b . . . 8n for the retailer 2a, 2b . . . 2n or supplier 4a, 4b . . . 4n system sending the first document. The data pool metadata 22a, 22b . . . 2n for each data pool 8a, 8b . . . 8n further includes (at block 114) a message archive 32 for the data pool 8a, 8b . . . 8n including messages received from suppliers 2a, 2b . . . 2n and retailers 4a, 4b . . . 4n directed to each data pool 8a, 8b . . . 8n and messages received from the data pools 8a, 8b . . . 8n directed to the suppliers or retailers.

Figure 4:
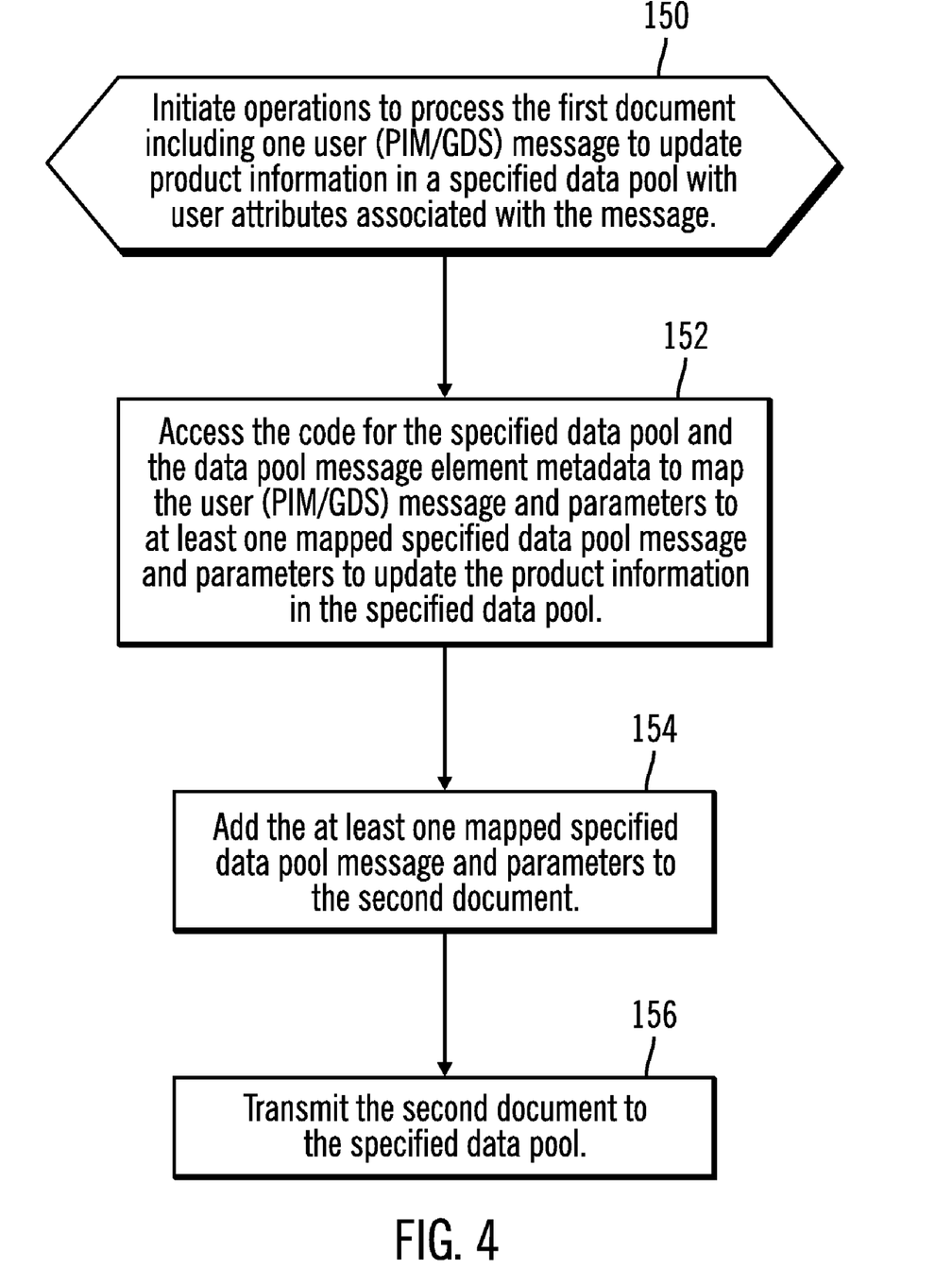

FIG. 4 illustrates operations the message manager 20 or other code performs (at block 150) to process the first document including one user (PIM/GDS) message to update product information in a specified data pool 8a, 8b . . . 8n with user (PIM/GDS) attributes associated with the user (PIM/GDS) message. The update may comprise a request to add information on a new product or add new information for a product already included in the data pool 8a, 8b . . . 8n. The message manager 20 accesses and executes (at block 152) the code 28 for the specified data pool 8a, 8b . . . 8n and the data pool message metadata 24 to map the user (PIM/GDS) message and parameters to at least one mapped specified data pool message and parameters to update the product information in the specified data pool 8a, 8b . . . 8n. The at least one mapped specified data pool message and parameters are added (at block 154) to the second document. The message manager 20 or code 28 then transmits (at block 156) the second document to the specified data pool 8a, 8b . . . 8n.

Figure 5:
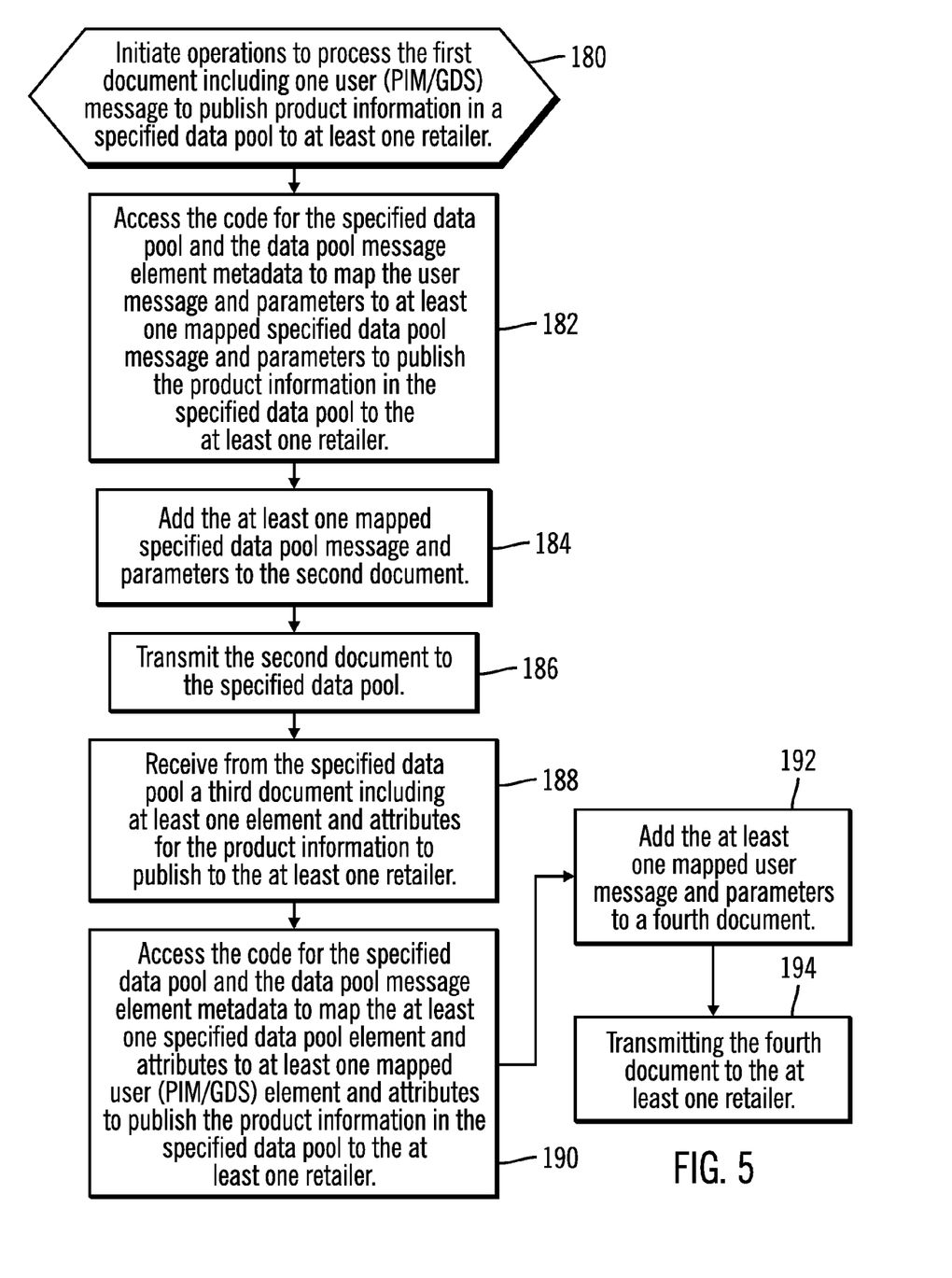

FIG. 5 illustrates operations the message manager 20 or other code performs (at block 180) to process the first document from one supplier system 2a, 2b . . . 2n including one user (PIM/GDS) message to publish product information in a specified data pool to at least one retailer system 4a, 4b . . . 4n. The message manager 20 accesses (at block 182) the code 28 for the specified data pool 8a, 8b . . . 8n and the message mapping 26 to map the user (PIM/GDS) message and parameters to at least one mapped specified data pool message and parameters to publish the product information in the specified data pool 8a, 8b . . . 8n to the at least one retailer system 4a, 4b . . . 4n. The at least one mapped specified data pool message and parameters are added (at block 184) to the second document and the second document is transmitted (at block 186) to the specified data pool 8a, 8b . . . 8n. Upon the message manager 20 receiving (at block 188) from the specified data pool 8a, 8b . . . 8n a third document including at least one element and attributes for the product information to publish to the at least one retailer system 4a, 4b . . . 4n, the message manager 20 accesses (at block 190) the code 28 and the message mapping 26 in the data pool metadata 22a, 22b . . . 22n for the specified data pool 8a, 8b . . . 8n to map the at least one specified data pool element and attributes to at least one mapped user (PIM/GDS) element and attributes in order to publish the product information in the specified data pool to the at least one retailer. The at least one mapped user (PIM/GDS) message and parameters are added (at block 192) to a fourth document that is transmitted (at block 194) to the at least one retailer.

Figure 6:
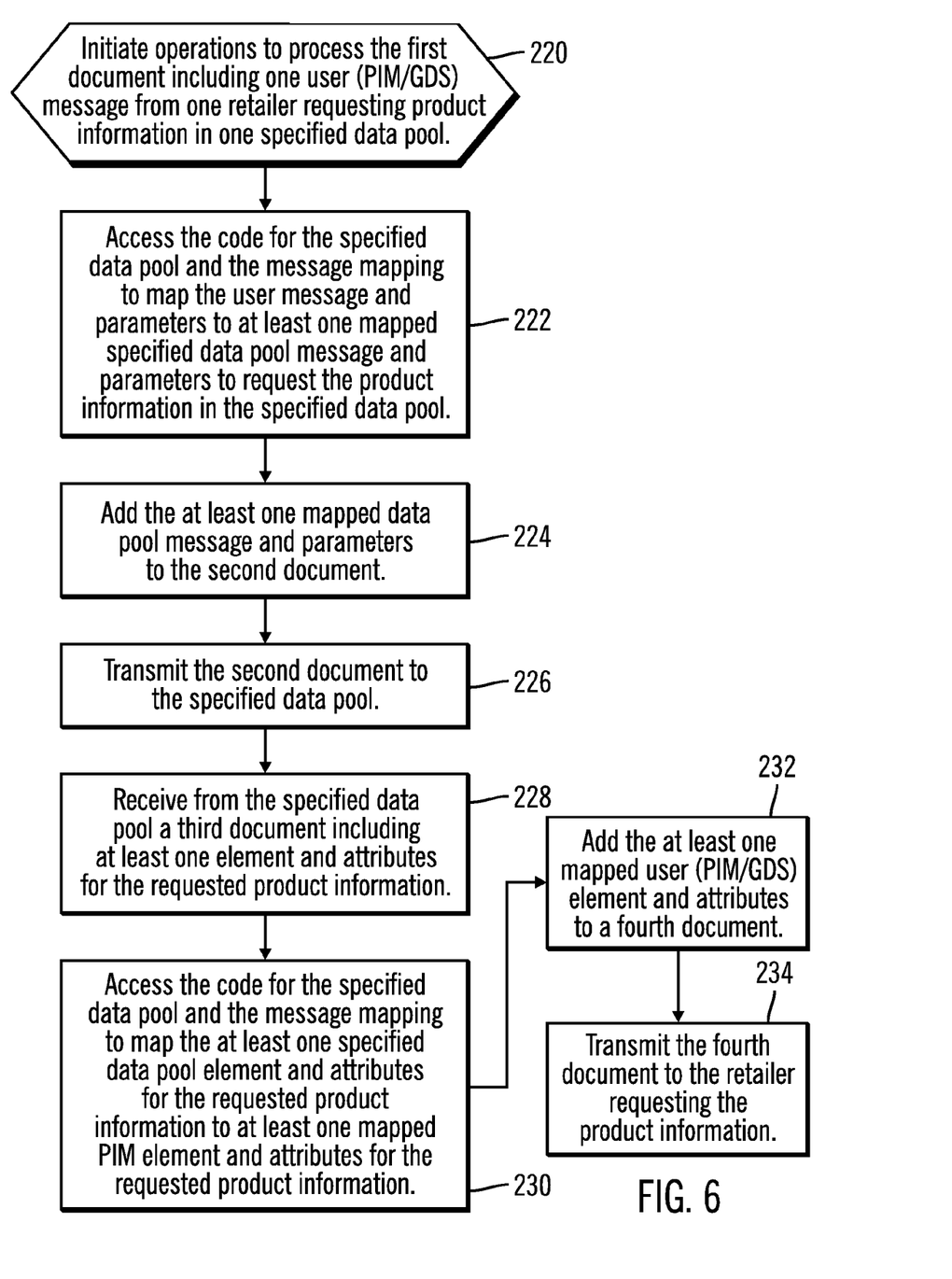

FIG. 6 illustrates operations the message manager 20 or other code performs (at block 220) to process the first document, e.g., 18, including one user (PIM/GDS) message from one retailer requesting product information in one specified data pool 8a, 8b . . . 8n. The message manager 20 accesses (at block 222) the code 28 and the data pool message element metadata 24 in the data pool metadata 22a, 22b . . . 22n for the specified data pool 8a, 8b . . . 8n to map the user (PIM/GDS) message and parameters to at least one mapped specified data pool message and parameters to request the product information in the specified data pool. The at least one mapped data pool message and parameters are added (at block 224) to the second document and transmitted (at block 226) to the specified data pool 8a, 8b . . . 8n.

Upon the message manager 20 receiving (at block 228) from the specified data pool 8a, 8b . . . 8n a third document including at least one element and attributes for the requested product information in the specified data pool 8a, 8b . . . 8n format, the message manager 20 accesses (at block 230) the code 28 for the specified data pool and the data pool message element metadata to map the at least one specified data pool element and attributes for the requested product information to at least one mapped user (PIM/GDS) element and attributes for the requested product information. The at least one mapped user (PIM/GDS) element and attributes are added (at block 232) to a fourth document, e.g., trade item related info 18, that is transmitted to the retailer system 4a, 4b . . . 4n initially requesting the product information.

With the operations of FIG. 3-6, the data pool manager 6 functions as middleware to provide an interface between the supplier systems 2a, 2b . . . 2n and retailer systems 4a, 4b . . . 4n and data pools 8a, 8b. The data pool manager 6 enables the suppliers and retailers to transmit messages and requests to multiple data pools 8a, 8b . . . 8n using a same user (PIM/GDS) format regardless of the format of documents and messages used by the target data pool 8a, 8b . . . 8n. Further, the data pool manager 6 handles the translation of the request document in the user (PIM/GDS) format to a document in the specific data pool 8a, 8b . . . 8n format and vice versa. This enables the suppliers and retailers to use a common tool to catalog and track their products and interface with different data pools that utilize different data formats than those used by the suppliers and retailers. In this way, the suppliers and retailers need only become accustomed with a single PIM/GDS tool and its XML data format and the data pool 8a, 8b . . . 8n handles the translation and interfacing with different data pools using different messaging and data formats.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the documents including the messages, elements and attributes comprise XML documents. In alternative embodiments, different structured documents may be used to transmit messages among suppliers, retailers and synchronized product data pools. Although document types other than XML may be used, in one embodiment, the supplier, retailer and data pools all use that same document type, e.g., the same spreadsheet type, an XML document, text document, Uniform Modeling Language (UML), etc., yet have different naming conventions and formats for messages and the different product information elements and attributes within the document type. In an alternative embodiment, the supplier, retailer and data pool may use different document types, e.g., XML, Hypertext Markup Language (HTML) documents, text files, spreadsheet files, etc. In such embodiments where the retailers, suppliers and data pools use different document types, e.g., one uses a spreadsheet, others use XML documents, then the data pool manager may translate between such different document types.

The illustrated operations of FIGS. 3-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    generating an element mapping in a computer readable storage device for each of a plurality of data mapping user elements and attributes to data pool elements and attributes, wherein data pools maintain product information;
    generating a message mapping for each of the plurality of data pools mapping user messages and their parameters to data pool messages and their parameters; and
    maintaining for each of the plurality of data pools code enabled to cause operations comprising receiving a first document including user elements and messages and mapping the user elements and messages in the first document to a second document including data pool elements and attributes corresponding to the user elements and messages in the first document, wherein the first document includes one user message from one retailer requesting product information in one specified data pool;
    accessing the code for the specified data pool and the message mapping to map the user message and parameters to at least one mapped specified data pool message and parameters to request the product information in the specified data pool;
    adding the at least one mapped data pool message and parameters to the second document; and
    transmitting the second document to the specified data pool.

2. The method of claim 1, further comprising:
    receiving from the specified data pool a third document including at least one element and attributes for the requested product information;
    accessing the code for the specified data pool and the message mapping to map the at least one specified data pool element and attributes for the requested product information to at least one mapped user element and attributes for the requested product information;
    adding the at least one mapped user element and attributes to a fourth document; and
    transmitting the fourth document to the retailer requesting the product information.

3. The method of claim 1, further comprising:
    maintaining operational metadata for each retailer and supplier initiating documents including user messages including access information to access at least one data pool; and
    transmitting the second document to the data pool using the access information to enable access to the data pool for the retailer or supplier sending the first document.

4. The method of claim 1, wherein the first document is directed to one specified data pool, further comprising:
    maintaining a message archive for each data pool including messages received from suppliers and retailers directed to each data pool and messages received from the data pool directed to the suppliers or retailers.

5. The method of claim 1, further comprising:
    processing a third document received from one of the data pools;
    mapping data pool elements and their attributes in the third document to user elements and attributes in a fourth document.

6. A system in communication with a plurality of data pools, comprising:
    a processor;
    a computer readable storage device in communication with the processor, comprising:
        an element mapping for each of the plurality of data pools mapping user elements and attributes to the data pool elements and attributes, wherein the data pools maintain product information;
        a message mapping for each of the plurality of data pools mapping user messages and their parameters to data pool messages and their parameters; and
        code, for each of the plurality of data pools, enabled to cause the processor to receive a first document including user elements and messages and map the user elements and messages in the first document to a second document including data pool elements and attributes corresponding to the user elements and messages in the first document, wherein the first document includes one user message to publish product information in a specified data pool to at least one retailer;
        accessing the code for the specified data pool and the message mapping to map the user message and parameters to at least one mapped specified data pool message and parameters to publish the product information in the specified data pool to the at least one retailer;
        adding the at least one mapped specified data pool message and parameters to the second document; and
        transmitting the second document to the specified data pool.

7. The system of claim 6, wherein the code is further enabled to cause the processor to perform:
    receiving from the specified data pool a third document including at least one element and attributes for the product information to publish to the at least one retailer;
    accessing the code for the specified data pool and the message mapping to map the at least one specified data pool element and attributes to at least one mapped user element and attributes to publish the product information in the specified data pool to the at least one retailer;
    adding the at least one mapped user message and parameters to a fourth document; and
    transmitting the fourth document to the at least one retailer.

8. The system of claim 6, wherein the computer readable storage device further includes operational metadata for each retailer and supplier initiating documents including user messages including access information to access at least one data pool, and wherein the code is further enabled to cause the processor to perform transmitting the second document to the data pool using the access information to enable access to the data pool for the retailer or supplier sending the first document.

9. The system of claim 6, wherein the first document is directed to one specified data pool, and wherein the computer readable storage device further includes a message archive for each data pool including messages received from suppliers and retailers directed to each data pool and messages received from the data pool directed to the suppliers or retailers.

10. The system of claim 6, wherein the code is enabled to cause the processor to further perform:
    processing a third document received from one of the data pools; and
    mapping data pool elements and their attributes in the third document to user elements and attributes in a fourth document.

11. An article of manufacture comprising a computer readable storage device including code executed to communicate with a plurality of data pools and perform operations, the operations comprising:
    processing an element mapping for each of the plurality of data pools mapping user elements and attributes to the data pool elements and attributes, wherein the data pools maintain product information;
    processing a message mapping for each of the plurality of data pools mapping user messages and their parameters to data pool messages and their parameters; and
    processing for each of the plurality of data pools code enabled to cause operations comprising receiving a first document including user elements and messages and mapping the user elements and messages in the first document to a second document including data pool elements and attributes corresponding to the user elements and messages in the first document, wherein the first document includes one user message from one retailer requesting product information in one specified data pool;
    accessing the code for the specified data pool and the message mapping to map the user message and parameters to at least one mapped specified data pool message and parameters to request the product information in the specified data pool;
    adding the at least one mapped data pool message and parameters to the second document; and
    transmitting the second document to the specified data pool.

12. The article of manufacture of claim 11, wherein the operations further comprise:
    receiving from the specified data pool a third document including at least one element and attributes for the requested product information;
    accessing the code for the specified data pool and the message mapping to map the at least one specified data pool element and attributes for the requested product information to at least one mapped user element and attributes for the requested product information;
    adding the at least one mapped user element and attributes to a fourth document; and
    transmitting the fourth document to the retailer requesting the product information.

13. The article of manufacture of claim 11, wherein the operations further comprise:
    processing operational metadata for each retailer and supplier initiating documents including user messages including access information to access at least one data pool; and
    transmitting the second document to the data pool using the access information to enable access to the data pool for the retailer or supplier sending the first document.

14. The article of manufacture of claim 11, wherein the first document is directed to one specified data pool, wherein the operations further comprise:

processing a message archive for each data pool including messages received from suppliers and retailers directed to each data pool and messages received from the data pool directed to the suppliers or retailers.

15. The article of manufacture of claim 11, wherein the operations further comprise:

processing a third document received from one of the data pools;

mapping data pool elements and their attributes in the third document to user elements and attributes in a fourth document.

\* \* \* \* \*